(12) United States Patent
Peterson et al.

(10) Patent No.: US 7,495,829 B2
(45) Date of Patent: Feb. 24, 2009

(54) DUAL FRONT/REAR PROJECTION SCREEN

(75) Inventors: Mark D. Peterson, Lake Oswego, OR (US); Kyle Ranson, West Linn, OR (US)

(73) Assignee: Infocus Corporation, Wilsonville, OR (US)

( * ) Notice: Subject to any disclaimer, the term of this patent is extended or adjusted under 35 U.S.C. 154(b) by 486 days.

(21) Appl. No.: 11/238,899

(22) Filed: Sep. 28, 2005

(65) Prior Publication Data
US 2007/0024967 A1 Feb. 1, 2007

Related U.S. Application Data

(60) Provisional application No. 60/703,160, filed on Jul. 27, 2005.

(51) Int. Cl.
*G03B 21/56* (2006.01)
*G03B 21/60* (2006.01)
(52) U.S. Cl. ..................... 359/459; 359/460
(58) Field of Classification Search ............. 359/443, 359/455–457, 459, 460, 449
See application file for complete search history.

(56) References Cited

U.S. PATENT DOCUMENTS

| | | | |
|---|---|---|---|
| 7,324,277 B2* | 1/2008 | Choi | 359/459 |
| 2004/0169921 A1* | 9/2004 | Suzuki et al. | 359/457 |
| 2005/0099687 A1* | 5/2005 | Watanabe | 359/455 |
| 2005/0270643 A1* | 12/2005 | Yoshikawa et al. | 359/457 |

OTHER PUBLICATIONS

Mocomtech Catalogue, "Dupic Screen," Nov. 9, 2005, http://www.mocomtech.com/technote/read.cgi?board=catalog_eng&y_number=8&bbew=2.
Electric Image Technologies, Inc., "Dupic Screens—The Greatest Innovation in Projection Screens . . . " 2003, http://electricimagetech.com/superbrightscreens/dupic.htm.

* cited by examiner

*Primary Examiner*—Christopher Mahoney
(74) *Attorney, Agent, or Firm*—Schwabe Williamson & Wyatt

(57) ABSTRACT

An apparatus, system, and method for a dual front/rear projection screen having a first exterior surface and a second exterior surface are disclosed herein. The second exterior surface may be shaped to facilitate transmission and reflection of a portion of light and enable viewing an image from both sides of the projection screen.

22 Claims, 3 Drawing Sheets

DUAL FRONT/REAR PROJECTION SCREEN

RELATED APPLICATION

The present application claims priority to provisional application No. 60/703,160, filed on Jul. 27, 2005, entitled "DUAL FRONT/REAR PROJECTION SCREEN." The specification of said provisional application is also hereby fully incorporated by reference in its entirety, except for those sections, if any, that are inconsistent with this specification.

FIELD

Embodiments of the invention relate generally to the field of projection screens, and more particularly to a dual front/rear projection screen.

BACKGROUND

Projection systems project images from a small display, or light valve, found in a projection device, onto a projection screen for viewing. Prior art projection systems are based on either front projection or rear projection. A front-projection system uses a projection device to project an image onto a screen which is then reflected back towards a viewer. In a rear-projection system, the projection device projects the image onto the screen, which transmits the image for viewing from the opposite side.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a dual front/rear projection screen and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
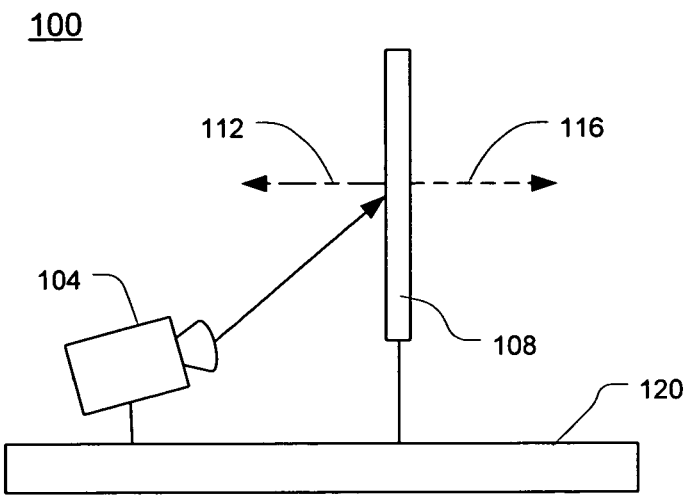
FIG. 1 illustrates a projection system, in accordance with an embodiment of the present invention.

FIG. 1 illustrates a projection system 100 in accordance with an embodiment of the present invention. In this embodiment, a projection device 104 may project an image onto a projection screen 108. The projection screen 108 may have a shaped surface to facilitate the reflection of a reflected portion 112 of the projected image back for viewing on the same side of the projection screen 108 as the projection device 104. The shaped surface of the projection screen 108 may also facilitate the transmission of a transmitted portion 116 through the projection screen 108 to be viewable from the side opposite the side that the projection device 104 is located.

The projection screen 108 being viewable from both sides may allow for flexibility in the placement of the projection screen 108. For example, the projection screen 108 may be placed more towards the center of a room, rather than a perimeter placement required by one-sided prior art projection screens. This may, in turn, facilitate deployment of the projection system 100, or parts thereof, in ways which may be impractical for prior art projection systems. For example, in one embodiment, the projection system 100 may be integrated with a housing 120 that is away from the perimeter of the room, e.g., a coffee table or the center of a conference table. The housing 120 may securely dispose one or more of the components of the projection system 100 relative to one another.

In various embodiments, the projection system 100 may be employed in any number of applications including, but not limited to, home theater, videoconferencing, and/or gaming applications.

Figure 2:
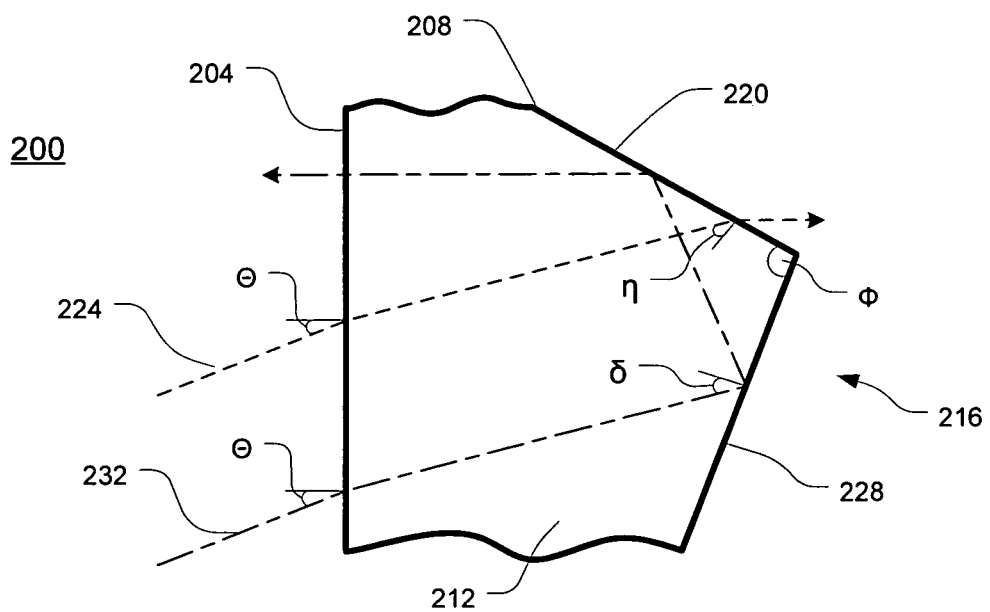
FIG. 2 illustrates a cross-section view of a portion of a projection screen, in accordance with an embodiment of the present invention.

FIG. 2 illustrates a cross-section view of a portion of a projection screen 200 in accordance with an embodiment of the present invention. The projection screen 200 may be substantially interchangeable with the projection screen 108 described above. In this embodiment, the projection screen 200 may have a surface 204 and a shaped surface 208 on opposite sides of a transparent substrate 212. In various embodiments the surface 204 may be shaped or substantially planar.

The shaped surface 208 may have one or more features, e.g., feature 216, formed directly into the substrate 212. In another embodiment, the feature 216, may be formed independent of the substrate 212 and subsequently coupled thereto.

The feature 216 of the shaped surface 208 may be formed by stamping, rolling, or by any other suitable manufacturing process. In one embodiment, the feature 216 may be cured following formation in order to provide for the desired material properties. In other embodiments, this curing step may not be used. The projection screen 200 may be constructed from materials having suitable mechanical, formable, and optical properties. Such materials could include, but are not limited to, a transparent polymer, glass, or plastic.

In one embodiment, the substrate 212 may include light-scattering particles suspended throughout the substrate 212. These particles may diffuse the light as it travels through the substrate 212 in order to lessen the occurrence of speckle.

In one embodiment, the feature 216 may include a face 220. A light ray 224 from a projection device may be incident upon the surface 204 at an angle $\Theta$. The angle $\Theta$ and the point of incidence may be such that the light ray 224 is transmitted through the projection screen 200. More particularly, and in accordance with this embodiment, the light ray 224 may be transmitted through the substrate 212 toward the face 220. At the face 220 the light ray 224 may be incident at an angle $\eta$, which may be of such a degree to allow the light ray 224 to be transmitted through the projection screen 200.

In one embodiment, the feature 216 may also include a face 228 which intersects the face 220 at an angle $\Phi$. A light ray 232 from the projection device may also be incident upon the surface 204 at an angle $\Theta$ (approximately). The angle $\Theta$ and the point of incidence may be such that the light ray 232 is reflected from the projection screen 200. More particularly, and in accordance with this embodiment, the light ray 232 may be transmitted through the substrate 212 toward the face 228. At the face 228, the light ray 232 may be incident at an angle $\delta$, which may be of such a degree to internally reflect, e.g., by total internal reflection, the light ray 232 towards the face 220. The reflected light ray 232 may also be internal reflected from the face 220 and be emitted out from the surface 204.

In various embodiments, reflections may be facilitated by reflective coatings.

In various embodiments, faces, e.g., the face 220 and/or face 228, may be any of a number of shapes including, but not limited to, substantially planar, as shown in FIG. 2, conical, cylindrical, spherical, and free-form. In one embodiment, a non-planar face may be implemented to spread light upon reflection and/or refraction of the light rays.

The dimensions of the face 220 and the face 228, as well as the angle $\Phi$, may be adjusted to accommodate parameters of various embodiments. One such parameter may be the projection angle that corresponds to the initial incident angle $\Theta$. Because this incident angle may change over the face of the projection screen, the dimensions and angles of the features may change correspondingly over the face. For example, in an embodiment having the projection device set at or below the projection screen 200, the faces of the features corresponding to face 220 may get smaller towards the top of the screen, while the faces corresponding to face 228 may get larger. The particular dimensions/angles may be determined based on optical properties such as index of refraction of the substrate 212, angle of projection, etc.

In this embodiment, features, which may or may not be similar to the feature 216, may be repeated over the shaped surface 208.

Figure 3:
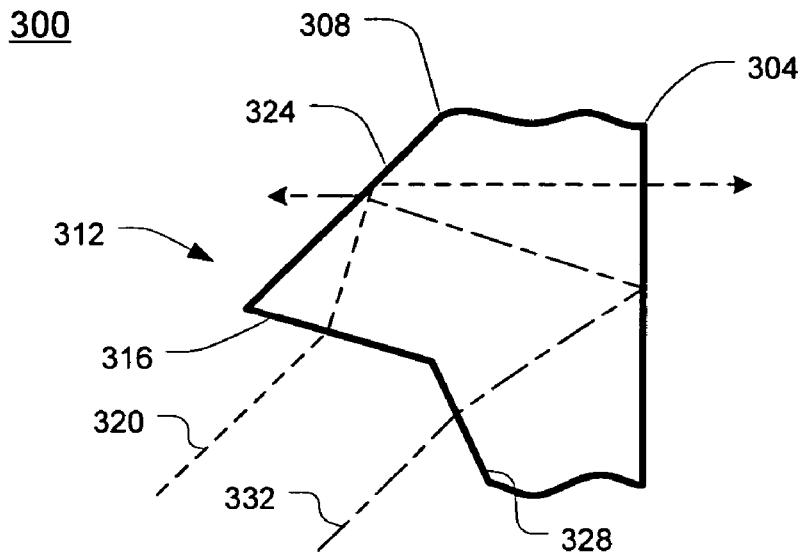
FIG. 3 illustrates a cross-section view of a portion of a projection screen, in accordance with another embodiment of the present invention.

FIG. 3 illustrates a cross-section view of a portion of a projection screen 300 in accordance with another embodiment of the present invention. The projection screen 300 may be substantially interchangeable with the projection screen 108 discussed above with reference to FIG. 1. In this embodiment, the projection screen 300 may have a surface 304 on one side and a shaped surface 308, with one or more features, e.g. feature 312, on an opposite side. Unlike the above embodiment, this embodiment may be configured to receive light from a projection device with the shaped surface 308 having the one or more features. This embodiment may accommodate steep projection angles from a projection device placed relatively close to the base of the projection screen 300.

In one embodiment, the feature 312 of the projection screen 300 may include a face 316. The face 316 of the feature 312 may be configured such that a light ray 320, from a projection device, may be transmitted through the projection screen 300. More particularly, and in accordance with this embodiment, the light ray 320 may be transmitted through the face 316 towards a face 324 where it may be reflected internally towards the surface 304. The light ray 320 may then be emitted from the surface 304.

In one embodiment, the feature 312 may also include a face 328. The face 328 may be configured such that a light ray 332, from the projection device, may be reflected from the projection screen 300. More particularly, and in accordance with this embodiment, the light ray 332 may be transmitted through the reflecting face 328 towards the surface 304 in a manner to facilitate internal reflection at the surface 304. The light ray 332 may then be emitted from the face 324.

In this embodiment, features, which may or may not be similar to the feature 312, may be repeated over the shaped surface 308.

Figure 4:
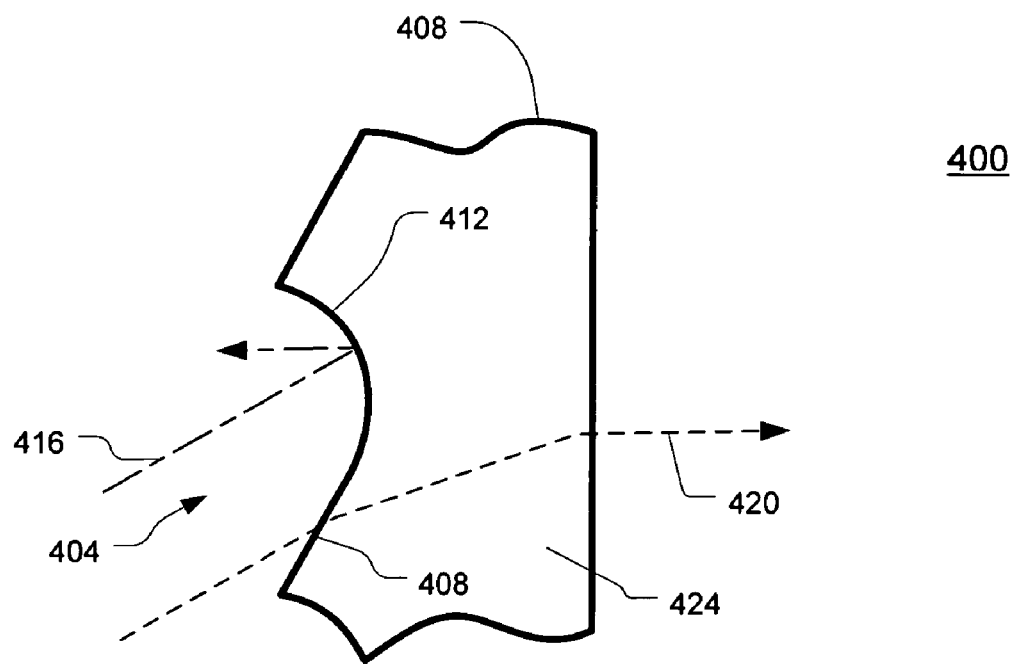
FIG. 4 illustrates a cross-section view of a portion of a projection screen, in accordance with another embodiment of the present invention.

FIG. 4 illustrates a projection screen 400 in accordance with another embodiment of the present invention. The projection screen 400 may be substantially interchangeable with the projection screen 108 described above. In the present embodiment, the projection screen 400 may have a feature 404 with a face 408 adjacent to a curved face 412. In this embodiment, the curved face 412 may be mirrored to reflect a light ray 416 received from a projection device, while the face 408 may transmit a light ray 420 received from the projection device. In this embodiment, the projection screen 400 may have a substrate 424 with diffusive properties.

Figure 5:
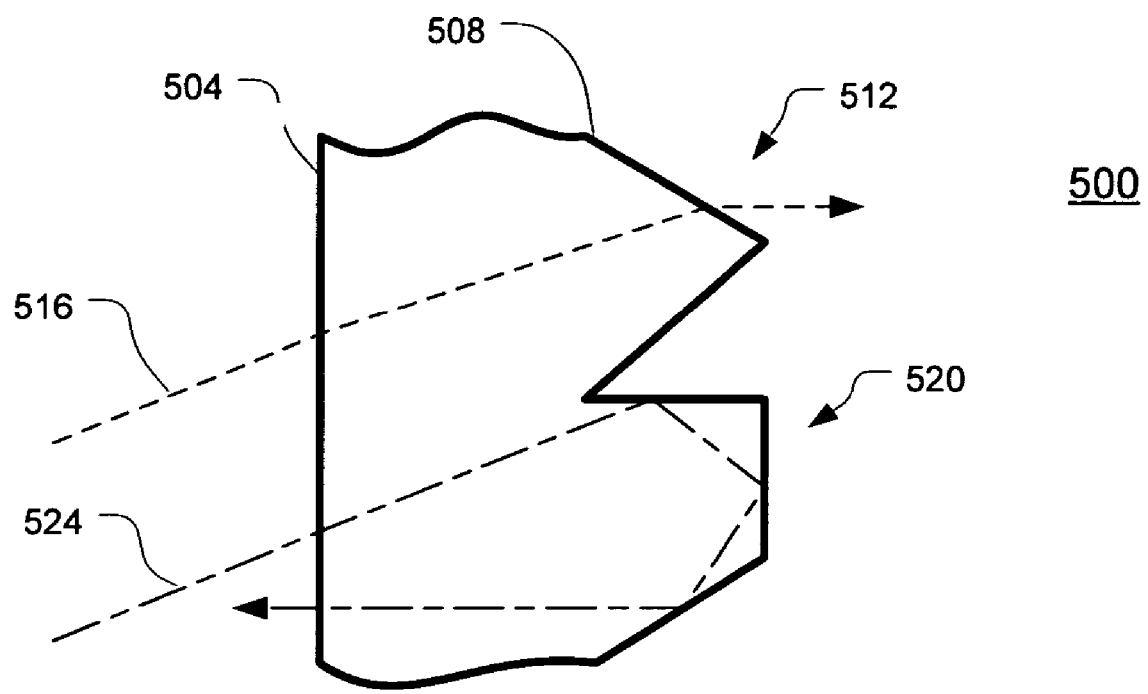
FIG. 5 illustrates a cross-section view of a portion of a projection screen, in accordance with another embodiment of the present invention.

While the above embodiments include a feature having faces to facilitate appropriate reflection and transmission of light rays, other embodiments may have a feature configured to facilitate transmission of light rays, while another feature is configured to facilitate reflection of light rays. FIG. 5 illustrates a cross-section view of a portion of a projection screen 500 in accordance with another embodiment of the present invention. The projection screen 500 may be substantially interchangeable with the projection screen 108 described above. In this embodiment, the projection screen 500 may have a surface 504 on one side and a shaped surface 508 on an opposite side.

In the present embodiment, the shaped surface 508 may include a feature 512 configured in such a manner as to facilitate the transmission of light rays through the projection screen 500. More particularly and in accordance with this embodiment, a light ray 516, from a projection device, may be incident upon the surface 504 in such a manner as to be transmitted to, and emitted from, the feature 512.

In one embodiment, the shaped surface 508 may also include a feature 520 configured in such a manner as to facilitate the reflection of light rays from the projection screen 500. More particularly, and in accordance with this embodiment, a light ray 524, from the projection device, may be incident upon the surface 504 in such a manner as to be transmitted to the feature 520 at an angle sufficient to cause the light ray 524 to go through a series of internal reflections at faces of the feature 520. The light ray 524 may ultimately be emitted from the surface 504. In this embodiment, transmitting features and reflecting features may be alternated over the face of the shaped surface 508.

In various embodiments, features configured to transmit and/or reflect, may be designed to accommodate incident angles typical for an area of a projection screen in which a particular feature is employed. For example, features at the top edge of the projection screen may be configured to accommodate steeper projection angles than features towards the bottom of the projection screen.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A projection screen comprising:
   a first exterior surface; and
   a second exterior surface, opposite the first exterior surface, shaped in a manner to facilitate transmission of a first portion of light through the projection screen to provide an image and reflection of a second portion of light from the projection screen to provide the image.

2. The projection screen of claim 1, wherein the second exterior surface further comprises a first face and a second face.

3. The projection screen of claim 2, wherein the first face is configured to receive the second portion of light and to transmit the second portion in a manner to facilitate the second portion being incident upon the first exterior surface at an angle sufficient to provide internal reflection from the first exterior surface.

4. The projection screen of claim 2, wherein the second face is configured to receive the first portion of light and to transmit the first portion in a manner to facilitate the first portion being incident upon the first exterior surface at an angle sufficient to provide transmission through the first exterior surface.

5. The projection screen of claim 4, wherein the first face is configured to receive and to reflect the second portion of light.

6. The projection screen of claim 5, wherein the first face includes a reflective coating.

7. he projection screen of claim 2, wherein the first exterior surface is configured to receive the first portion of the light and to transmit the first portion in a manner to facilitate the first portion being incident upon the second face at an angle sufficient to provide transmission through the second face.

8. The projection screen of claim 2, wherein the first exterior surface is configured to receive the second portion of the light and to transmit the second portion in a manner to facilitate the second portion being incident upon the first face at an angle sufficient to provide internal reflection from the first face.

9. The projection screen of claim 2, wherein the first face and the second face are components of a first feature, the projection screen further comprising:
   a plurality of features, including the first feature, arranged in an array, each of the plurality of features having dimensions based at least in part upon a location of the feature within the array.

10. The projection screen of claim 1, wherein the second exterior surface comprises a face selected from the group consisting of a substantially planar face, a cylindrical face, a spherical face, a conical face, and a free-form face.

11. The projection screen of claim 1, wherein said transmission of the first portion of light and/or reflection of the second portion of light is the result of one or more internal reflections within the projection screen.

12. The projection screen of claim 1, further comprising: a substrate having the first exterior surface and the second exterior surface.

13. The projection screen of claim 12, wherein the substrate comprises a volumetric diffuser.

14. A system comprising:
   a projection device configured to project an image; and
   a projection screen configured to receive the image, reflect a first portion of the image and transmit a second portion of the image, the projection screen including a first exterior surface; and
   a second exterior surface, opposite the first exterior or surface, shaped in a manner to facilitate transmission of a first portion of the image through the projection screen and reflection of the second portion of the image from the projection screen.

15. The system of claim 1 4, wherein the second exterior surface of the projection screen further comprises a first face and a second face.

16. The system of claim 14, wherein the second exterior surface of the projection screen further comprises a transmitting feature and a reflecting feature.

17. The system of claim 14, wherein the second exterior surface of the projection screen further comprises:
   a plurality of features arranged in an array, each of the plurality of features having dimensions based at least in part upon a location of the feature within the array.

18. The system of claim 14, further comprising:
   a housing configured to facilitate a secured disposition of the projection device and the projection screen relative to one another.

19. A method comprising:
   receiving a projected image from a projection device with a projection screen;
   transmitting a first portion of the projected image through the projection screen; and
   reflecting a second portion of the projected image from the projection screen, said transmitting and reflecting at least partially facilitated by a shape of at least one exterior surface of the projection screen.

20. The method of claim 19, wherein said transmitting of a first portion is at least partially facilitated by a first face on the at least one exterior surface of the projection screen.

21. The method of claim 19, wherein said reflecting of a second portion is at least partially facilitated by a second face on the at least one exterior surface of the projection screen.

22. The method of claim 19, wherein said transmitting of a first portion is at least partially facilitated by a first feature on the at least one exterior surface of the projection screen, and said reflecting of a second portion is at least partially facilitated by a second feature on the at least one exterior surface of the projection screen.

* * * * *